United States Patent [19]
Jechel et al.

[11] Patent Number: 4,999,246
[45] Date of Patent: Mar. 12, 1991

[54] GLASS LAMINATED STRUCTURE, LAMINATING APPARATUS, AND METHODOLOGY

[75] Inventors: Kurt E. Jechel, San Juan Capistrano; Jerome C. Schutzler, Laguna Niguel, both of Calif.

[73] Assignee: PDA Engineering, Costa Mesa, Calif.

[21] Appl. No.: 267,500

[22] Filed: Nov. 4, 1988

Related U.S. Application Data

[62] Division of Ser. No. 19,234, Feb. 26, 1987, Pat. No. 4,806,191.

[51] Int. Cl.$^5$ .......................... B32B 17/00; E04C 2/54
[52] U.S. Cl. ..................................... 428/192; 428/212; 428/415; 428/417; 428/426; 428/447; 428/448; 428/913; 52/789
[58] Field of Search .................. 428/34, 38, 45, 46, 428/47, 192, 413, 414, 415, 417, 425.6, 426, 430, 435, 212, 446, 447, 448; 156/107–109; 52/67, 672, 788–790

[56] References Cited

U.S. PATENT DOCUMENTS 4,830,913 5/1989 Ortman et al. ..................... 428/34

FOREIGN PATENT DOCUMENTS 2102239 8/1971 France .

Primary Examiner—Ellis P. Robinson
Assistant Examiner—Donald J. Loney
Attorney, Agent, or Firm—Gordon L. Peterson

[57] ABSTRACT

A glass laminated structure includes a core of curable flowable material sandwiched between first and second glass panels. A pair of frame members sealed to the panels with an ultraviolet curing adhesive overlap marginal portions of the panels so that an overlapping portion of the core abuts the peripheral edges of the panels to absorb stress and inhibit delamination. The laminating apparatus includes platens with vacuum ports for securing the panels to the platens without excessive panel deformation, recessed portions for proper frame member alignment, and elastomeric seals supplanting the usual vacuum grease. The methodology proceeds by retaining the glass panels and frame members in position using the platens, and sealing the frame members to the panels. Then, the curable flowable material is introduced so that it flows between the frame members to abut the peripheral edges of the glass panels. The flowable material is then cured, with the overlapping portion of the flowable material bearing against the peripheral edges to offset stresses and inhibit delamination.

12 Claims, 3 Drawing Sheets

FIG 4

GLASS LAMINATED STRUCTURE, LAMINATING APPARATUS, AND METHODOLOGY

This application is a division of application Ser. No. 019,234, filed Feb. 26, 1987, now U.S. Pat. No. 4,806,191.

BACKGROUND OF THE INVENTION

1. Technical Field

This invention relates generally to laminated structures, and more particularly to a glass laminated structure suitable for use as a thermal energy barrier.

2. Background Information

U.S. Pat. No. 4,439,392 to Schutzler et al. describes a glass laminated structure suitable for blocking high intensity thermal radiation such as might result from a nuclear blast. It is fabricated according to a novel method which includes retaining first and second panels against first and second platens, introducing a photochromic epoxy material between the panels, and curing the epoxy to produce the laminate.

The laminated structure of the Schutzler et al. patent includes glass panels that abut generally coplanar frame members that circumscribe the panel peripheries in end-to-end relationship, and deformable seals disposed between the panels and frame members that seal the panel-frame interface. This arrangement provides the desired peripheral framework sealed to the glass panels, but it results in the epoxy-panel interface that tends to delaminate under certain extreme temperature conditions.

The tendency to delaminate results from the different thermal coefficients of expansion exhibited by the epoxy core and the glass panels. This difference produces stresses that translate to a shearing force couple at the epoxy-panel interface of sufficient magnitude to defeat the bond. The stresses are not adequately absorbed so that defective structures may result. Consequently, it is desirable to have a new and improved glass laminated structure that overcomes this concern.

The method and tooling of the Schutzler et al. patent are very effective and applicable to the making of the improved glass laminated structure of this invention. However, certain aspects of the laminating process and tooling described in the Schutzler et al. patent could be made even better. For example, the elongated grooves for retaining the glass against the platens tend to result in the glass deforming into the groove. Also, the vacuum grease used in sealing the glass panels against the platens sometimes contaminates the inner panel surfaces that are to be bonded to the epoxy core, and this impairs the bond.

The silicon sealing material used as a seal between the glass panels and the frame also contaminates the inner panel surfaces occasionally. In addition, it takes relatively long to cure. Furthermore, tape is often used to seal the outer edges of the frame, and this takes additional time and care. Therefore, it is desirable to have an improved laminating apparatus and methodology that overcomes these concerns also.

SUMMARY OF THE INVENTION

This invention recognizes the problems associated with the prior art and provides a new and improved glass laminated structure, and the apparatus and method for making it.

Briefly, the glass laminated structure includes a pair of first and second glass panels in generally parallel, spaced-apart juxtaposition having facing inner surfaces and oppositely disposed outer surfaces. Each one of the glass panels includes a circumscribing peripheral edge extending between the inner and outer surfaces and a marginal portion of the outer surface extending to the peripheral edge.

A pair of first and second frame members in generally parallel, spaced-apart juxtaposition circumscribes the glass panels so that each one of the frame members overlaps a respective one of the marginal portions of the glass panels. Each one of the frame members is sealed to the respective marginal portion in this position.

A core of cured flowable material disposed between the glass panels includes an overlapping portion disposed between the frame members in a position abutting the peripheral edges of the glass panels. Integrity of the bond between the core and glass panels is thus enhanced, the core bearing against the peripheral edges to offset delamination stresses resulting from different coefficients of thermal expansion. Accordingly, delamination is less likely to occur even under extreme temperature conditions.

An improved apparatus for making the glass laminated structure employs several known features, including a pair of first and second platens. Each one of the platens has a broad face of a desired configuration adapted to have a respective one of a pair of first and second panels retained on the face in confronting relationship with the face.

The platens define vacuum paths for communicating vacuum pressure to the platen face to retain the respective glass panel against the face. In addition, the apparatus includes components mounting the platens for pivotal movement. They can be moved between a first position in which the faces are exposed to facilitate the placement of the respective panel against each one of the faces, and a second position in which the faces are in spaced generally parallel relationship. Suitable components stop the platens in the second position.

However, the apparatus of this invention is improved to overcome the tendency for the glass to be drawn too far into the vacuum paths. The improved apparatus includes an apertured portion of each one of the platens, each one of the apertured portions defining a port through which the vacuum is communicated to the face of the platen. The port is of a size enabling the glass panels to be held by vacuum pressure against the platen faces without deforming the glass panels into the vacuum paths thus defined. Of course more than one port can be used if desired. In addition, the apparatus includes recessed portions in which to place the frame members so that the frame members are retained in the desired overlapping relationship with the marginal portions of the glass panels.

The method of making a glass laminated structure according to the invention includes the steps of retaining a pair of first and second glass panels in generally parallel, spaced-apart juxtaposition, and retaining a pair of first and second frame members in generally parallel, spaced-apart juxtaposition, so that the frame members circumscribe the glass panels and each one of the frame members overlaps a marginal portion of a respective one of the glass panels. This can be accomplished with the improved apparatus of the invention.

The method proceeds by sealing each one of the frame members to the marginal portion of the respective one of the glass panels. Then, a curable flowable material is introduced between the glass panels. The flowable material may be of a known type that includes a photochromic substance for inhibiting passage of high intensity thermal radiation. With the frame members in a position overlapping the glass panels, an overlapping portion of the flowable material fills the space between the frame members and abuts a peripheral edge of each one of the glass panels.

The flowable material is then cured, and with the flowable material so disposed, it bears against the peripheral edges during curing to inhibit delamination. In addition, the resulting glass laminated structure can withstand more extreme variations in ambient temperature during use without lamination failure.

The method may include using elastomeric seals to seal the glass panels to the platen faces, thus avoiding contamination of the inner panel surfaces by vacuum grease, and using an elastomeric seal between the frame members to overcome the time and care required to apply tape.

In addition, the method may include using a fast curing material between the frame members and the marginal portions of the glass panels, such as an ultraviolet curable adhesive material. This not only reduces contamination of the glass panels, but also curing time, and it can provide a seal that does not set until desired. Furthermore, sealing in this manner does not load and deform the glass panels in the manner a preformed seal may.

Thus, this invention overcomes various concerns associated with the prior art. The lamination is less prone to fail during fabrication and in use. In addition, the glass panels are not drawn into the vacuum paths provided, nor contaminated by the vacuum grease and silicone previously used. Moreover, the use of ultraviolet curable adhesive and elastomeric seals instead of tape greatly reduces fabrication time and increases reliability.

These and other objects and features of the invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 2:
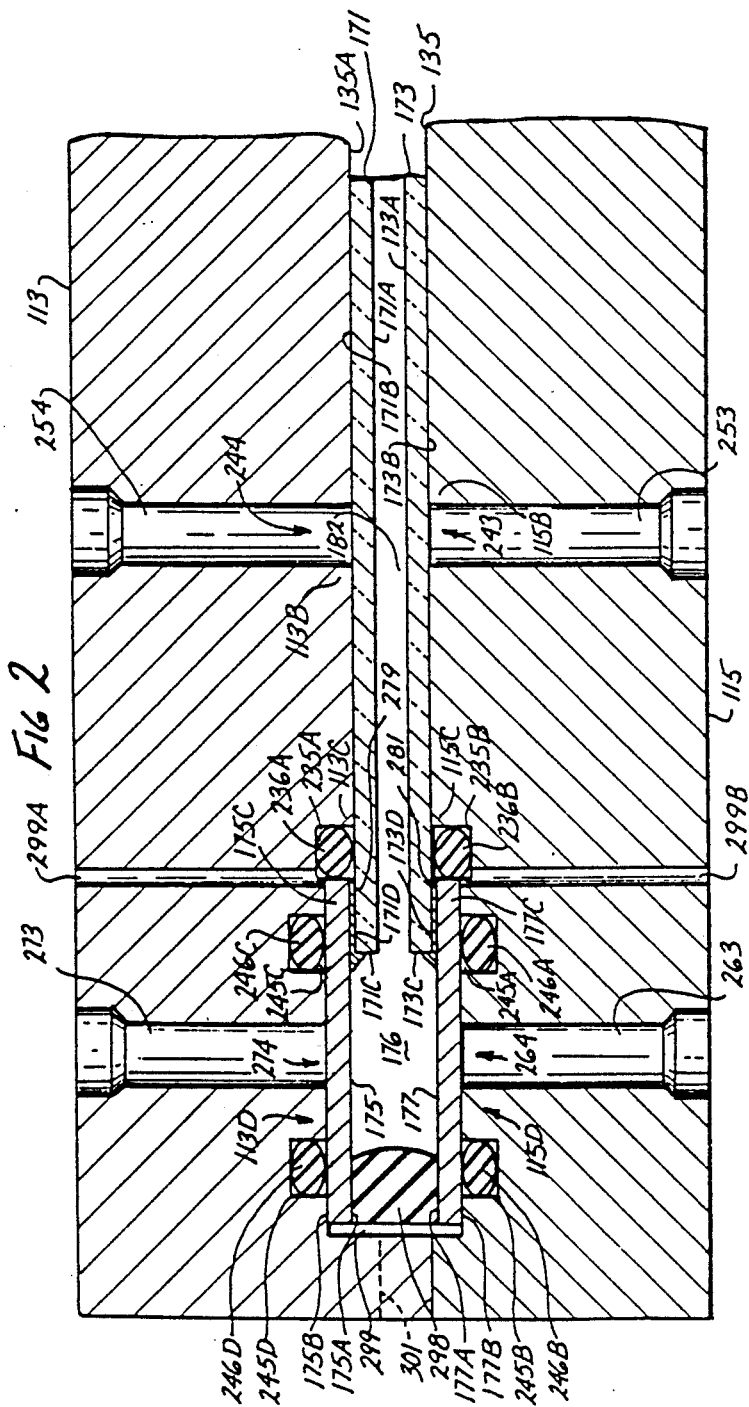
FIG. 2 is an enlarged cross sectional view of a portion of the apparatus taken on line 2—2 of FIG. 1, showing components of the inventive glass laminated structure within.
Figure 3:
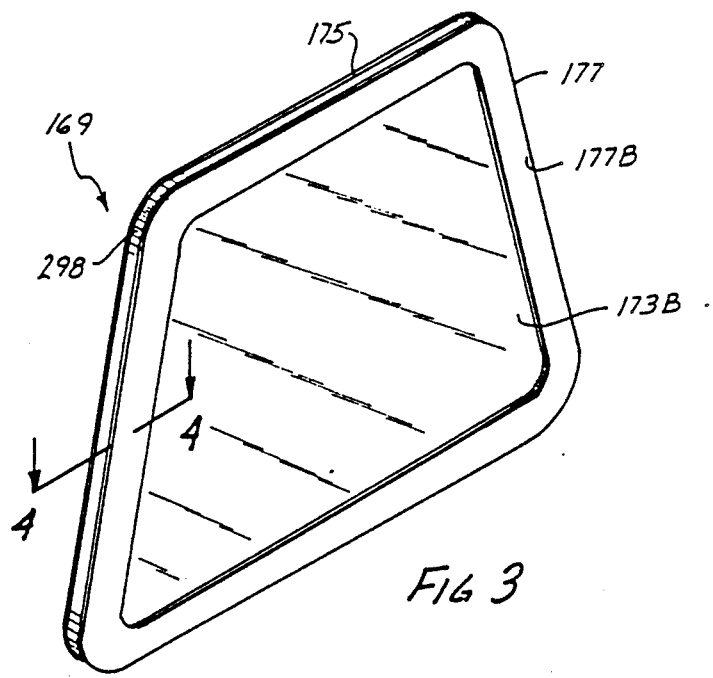
FIG. 3 is a perspective view of the inventive glass laminated structure apart from the laminating apparatus.
Figure 4:
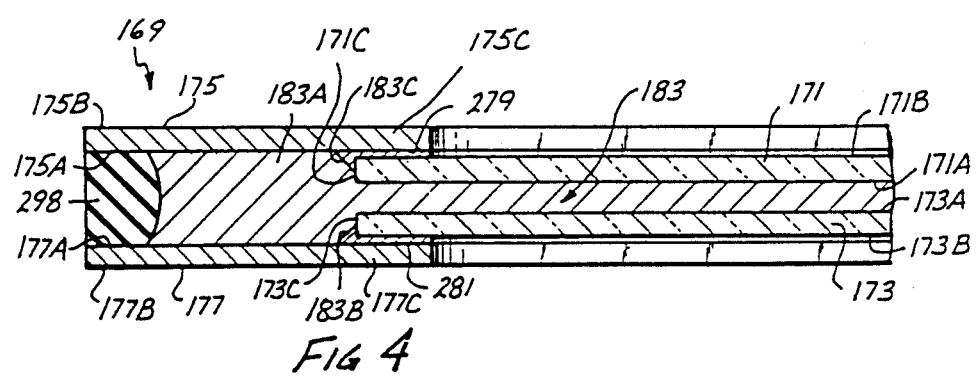
FIG. 4 is a cross sectional view of the glass laminated structure taken on line 4—4 of FIG. 3.

Referring now to the drawings, there is shown a new and improved apparatus in the form of tooling 111 (FIGS. 1 and 2), which is constructed according to the invention and which can be used to carry out the method of the invention to produce the glass laminated structure 169 illustrated in FIGS. 3 and 4.

The tooling 111 and laminated structure 169 are similar in several respects to the tooling 11 and laminated structure 69 described in U.S. Pat. No. 4,439,392 to Schutzler et al., and that patent is incorporated herein by reference for the details provided of the apparatus, method, and laminated glass structure described. For convenience, many of those of the reference numerals in FIGS. 1-4 designating features corresponding in some respects to features in the Schutzler et al. patent are increased by 100 over the corresponding reference numeral in the Schutzler et al. patent.

Figure 1:
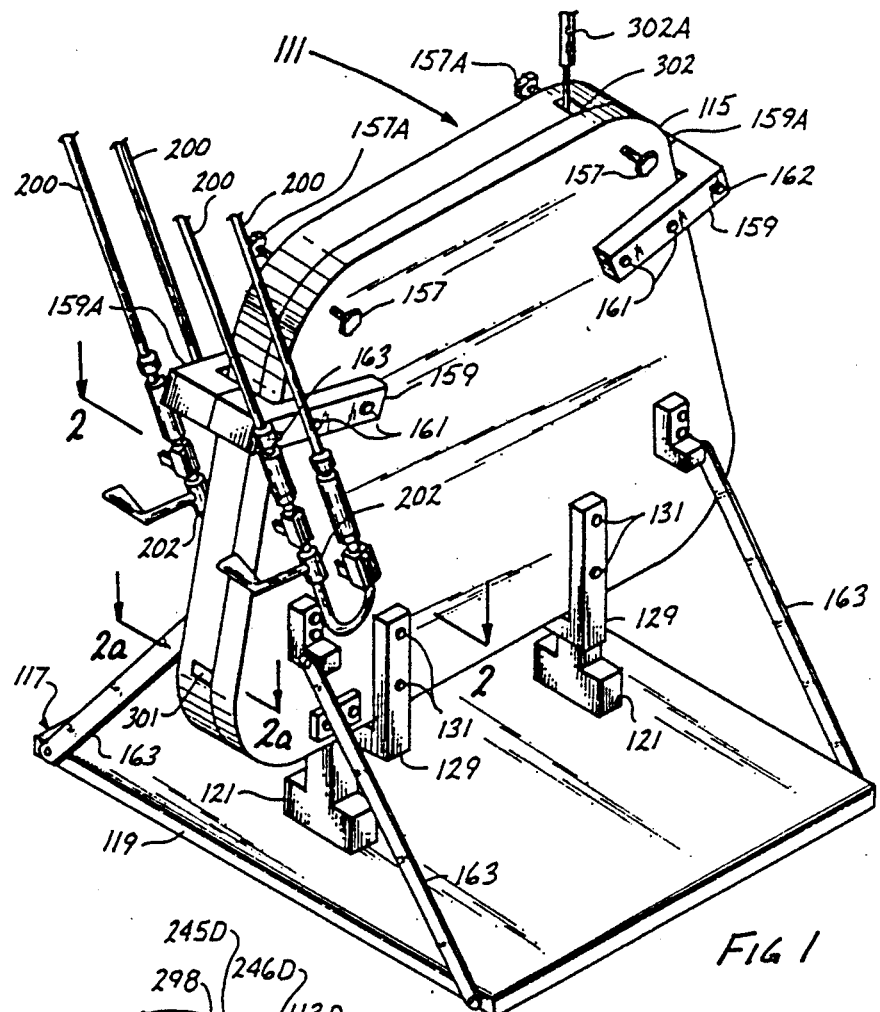
FIG. 1 of the drawings is a perspective view of an apparatus constructed according to the invention which can be used in carrying out the method of the invention.
Figure 2A:
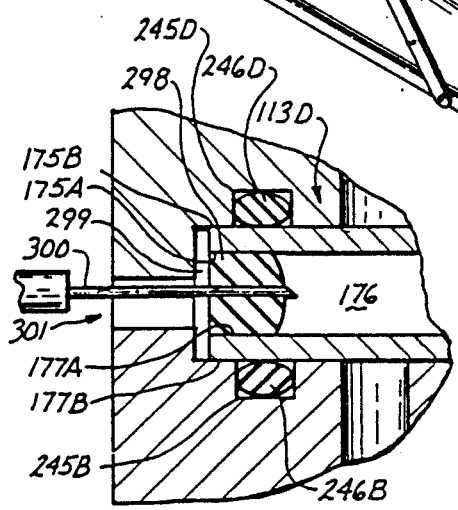
FIG. 2a is a fragmentary view taken on line 2a—2a of FIG. 1 that is similar to a portion of FIG. 2, but with a needle inserted for injecting the core material.

Considering first the tooling 111, it includes two substantially identical platens 113 and 115 mounted on supporting structure 117 for pivotal movement between a first or loading position and a second or curing position. Although various orientations are possible, preferably the platens 113 and 115 are generally horizontal in the loading position and generally vertical as illustrated in FIG. 1 in the curing position.

The supporting structure 117 can be of any construction which is suitable for mounting the platens 113 and 115 for the necessary movement. In the tooling 111, the supporting structure 117 includes a base 119 in the form of a relatively broad flat plate, and identical bearing blocks 121 mounted on the upper face of the base 119.

Although many different constructions can be used, the platens 113 and 115 are mounted for pivotal movement on the bearing blocks 121 by L-shaped brackets 129. These are rigidly attached to the platens by suitable means such as screws 131, and pivotally mounted on the bearing blocks 121 by suitable means such as rods that define a horizontal pivot axis for the platens (not shown).

The platens 113 and 115 may be constructed of a suitable metal such as aluminum and may be of various different configurations depending upon the shape of the laminated structure which is to be made using the platens. In the tooling 111, they are generally trapezoidal, but this shape is purely illustrative.

The platens 113 and 115 have stop means defining the two positions of the platens. These may take different forms. The illustrated embodiment employs feet 157 on the platen 115 and feet 157A of the platen 113 that can be screwed into the platens varying amounts so that the height of the platens in the loading position can be varied. A plurality of pairs of generally L-shaped blocks 159 and 159A mounted on the platens by screws 161 are used to retain the platens in the curing position. A pair of confronting blocks 159 and 159A are held together as illustrated in FIG. 1 by threaded fasteners 162, and this retains the platens securely in the curing position.

Glass panels are held against the platens by vacuum pressure, i.e. differential fluid pressure, and this is accomplished with vacuum pressure coupled from a separate source (not shown) through conduits 200. Suitable means such as manual valves 202 can be used to couple the vacuum as desired.

Referring now to FIG. 2, there is shown a cross sectional view of the tooling 111, with a pair of first and second glass panels 171 and 173 and first and second frame members 175 and 177 held in place against the platens 113 and 115. The platens are in the curing position, with the panels and frame members properly positioned for introduction of a curable flowable material between the panels.

The panel 171 has an inner surface 171A, an outer surface 171B, a circumscribing peripheral edge 171C extending between the inner and outer surfaces, and a marginal edge portion 171D of the outer surface 171B extending to the peripheral edge 171C. The panel 171 is held against a flat face 135A of platen 113 by vacuum pressure coupled through a path 254 to a port 244 defined by an apertured portion 113B of the platen 113. The port 244 is generally circular in shape and of sufficient cross sectional area to retain the glass panels in place without causing panel deformation into the port.

The platen 113 includes face sealing means for use in providing generally fluid tight sealing engagement between each one of the faces and the respective one of the glass panels. A grooved portion 113C defines an annular groove 235A in which an elastomeric sealing member 236A is disposed for this purpose. The groove 235A extends around a major portion of the face in a position facing the periphery of the panel 171, and the sealing member 236A within provides sealing engagement with the outer surface 171B of the panel 171 to facilitate retention against the face 135A by vacuum pressure. The sealing member may be a tubular O-ring type seal composed of a suitable material such as silicone.

Similarly, the panel 173 has an inner surface 173A, an outer surface 173B, a circumscribing peripheral edge 173C extending between the inner and outer surfaces, and a marginal edge portion 173D of the outer surface 173B extending to the peripheral edge 173C. The platen 115 has a flat face 135, and a grooved portion 115C defining a groove 235B in which an elastomeric sealing member 236B is disposed to provide sealing engagement with the outer surface 173B of the panel 173. Vacuum pressure is coupled through a path 253 to a port 243 defined by an apertured portion 115B of the platen 115 to hold the panel in place.

Held in this manner between the platens 113 and 115, the panels 171 and 173 are retained in generally parallel, spaced-apart juxtaposition, with the inner surfaces 171A and 173A facing and the outer surfaces 171B and 173B oppositely disposed, facing respective ones of the platen faces 135 and 135A. The sealing members 236A and 236B are compressed by the associated panels 171 and 173, and the panels are held against their respective platens 113 and 115 with sufficient force to deform them to closely conform to the associated faces 135 and 135A.

The tooling 111 includes frame positioning means for use in positioning and retaining annular frame members 175 and 177 in the desired position relative to the glass panels 171 and 173. This is accomplished by retaining the frame members 175 and 177 against the platens 113 and 115 in a recess defined by recessed portions 113D and 115D. Vacuum pressure communicated through a pair of paths 263 and 273 to respective ones of a pair of ports 264 and 274 defined in the recessed portions, holds the frame members in place. Ports 264 and 274 are provided in the recessed portions 113D and 115D for this purpose.

The recessed portions 113D and 115D also define a set of four annular grooves 245A-D in which a set of four elastomeric sealing members 246A-D are disposed. This serves as recess sealing means for use in providing generally fluid tight sealing engagement between each one of the platens 113 and 115 and the respective one of the frame members 175 and 177. In this manner, the frame members 175 and 177 are retained in generally parallel, spaced-apart juxtaposition circumscribing and in the desired position relative to the panels 171 and 173.

Properly positioned, the inner surface 175A of frame member 175 faces the inner surface 177A of frame member 177, and the outer surfaces 175B and 177B face respective ones of the recessed portions 113B and 115B of the platens 113 and 115. In addition, an overlapping portion 175C of the frame member 175 overlaps the marginal portion 171D of the panel 171, and an overlapping portion 177C of the frame member 177 overlaps the marginal portion 173D of the panel 173.

The overlapping portions 175C and 177C overlap a sufficient amount to enable the frame members to be sealed to the marginal edge portions 171D and 173D with seals 279 and 281 which may be an adhesive material. In the illustrated embodiment the adhesive material 279 and 281 is a known adhesive material of the type that cures when exposed to ultraviolet light. This feature significantly reduces fabrication time, and allows greater control of when the seal sets.

With the frame members 175 and 177 aligned and bonded to the panels 171 and 173 in this manner, there is a space 182 (FIG. 2) defined between the panels 171 and 173 to be filled with a curable flowable material that will form the core of the glass laminated structure as will be subsequently discussed. By virtue of the relative position of the panels and frame members, the flowable material will extend into a peripheral chamber 176 defined between the frame members 175 and 177 so that it bears against the peripheral edges 171C and 173C during curing to inhibit delamination due to the different thermal coefficients of expansion of the glass and the core.

A seal 298 completes the setup within the tooling 111. The seal 298 is of suitable composition compatible with high temperature epoxy, such as silicone, and it overcomes the time consuming and less effective use of tape. In the illustrated embodiment, the seal 298 is generally coterminus with frame members 175 and 177. A slight space 299 is provided for clearance to facilitate loading of the components into the mold. The seal 298 provides a finished edge in the completed glass laminated structure. It eliminates the need to remove the edges of the frame extending beyond the core, and it seals to some degree against ingress of moisture.

Preferably, the seal 298 is penetrable by the hypodermic-type needle 300 as illustrated in the fragmentary view of FIG. 2a so that the needle can be used to inject a curable flowable material in between the panels and frame members. Other means of introducing the flowable material may be employed, but the illustrated tooling 111 includes at least one injection hole 301 in the form of a slot (FIGS. 1 and 2a) through which the needle 300 can be placed for this purpose. A vent hole 302 (FIG. 1) and needle 302A may be used as a vent, with the vent being at the highest location in the closed platens to provide for complete venting of air during molding.

In addition, bleed passages 299A and 299B are provided that extend from the exterior of the tooling 111 to respective ones of the grooves 235A and 235B. The bleed passages maintain an inner portion of the grooves at atmospheric pressure, and this serves two functions. First, a leak is less likely to occur across seals 279 and 281 because pressure drops across these seals are reduced. Second, if a leak occurs in the seals 279 and 281, the curable flowable material injected between the panels and frame members would otherwise tend to flow toward the vacuum ports 254 and 253 due to the pressure differential between the peripheral chamber 176 and the ports. If this happens, the platen faces become contaminated and the panels stick to the platens. However, with the bleed passages 299A and 299B, leakage of the curable flowable material flows out the bleed passages where it can be visually detected to alert the operator of the condition.

Generally, the method of making a glass laminated structure according to the invention, includes retaining a pair of first and second glass panels in generally parallel, spaced-apart juxtaposition, and a pair of first and second frame members in generally parallel, spaced-apart juxtaposition, so that the frame members circumscribe the glass panels and each one of the frame members overlaps a marginal portion of a respective one of the glass panels.

This may be accomplished by placing each one of the frame members against a respective one of the platens 113 and 115 using the tooling 111 as described, and then placing each one of the glass panels against the platens. With the sealing members 246 A-D in place, a generally fluid tight seal is achieved, and by coupling a vacuum source through the vacuum ports, each one of the frame members and glass panels are retained in position against the respective one of the platens.

With the frame members 175 and 177 and the glass panels 171 and 173 retained against the platens by vacuum pressure, the sealing material 279 and 281 is introduced between the frame members and glass panels. This may be accomplished by depositing the sealing material along the panel-frame interface so that it is drawn by capillary action into a position between the frame members and glass panels.

The sealing material 279 and 281 is then cured by exposing it to ultraviolet light. Alternate sealing materials may be left for a period of time to set. Once set, the seal 298 is loaded, the needles 300 and 302A are inserted through the holes 301 and 302 in the seal, and the platens are pivoted to the curing position to properly position the frame members and glass panels.

Then, a curable flowable material is introduced between the glass panels using the needle 300. The flowable material that forms the core of the glass laminated structure may be a known epoxy material of the type described in the Schutzler et al. patent, one that includes a photochromic substance that serves as barrier means for inhibiting passage of high intensity radiation. With the frame members overlapping the glass panels, the flowable material flows between the frame members so that an overlapping portion of the flowable material is disposed between the frame members in a position abutting a peripheral edge of each one of the glass panels.

Then, the flowable material is cured to adhere the panels, frames, and seal 298 together to produce a laminated glass structure such as the glass laminated structure 169 illustrated in FIGS. 3 and 4. After curing, the platens are pivoted to the loading position and the completed structure is removed.

Of course, many of the method and tooling features of this invention can be used to make various different laminated structures. Conversely, the laminated structure 169 can be made with other methods and tooling. Introduction and curing of the flowable material 183 (FIG. 4) may be accomplished as described in the Schutzler et al. patent, but when done in combination with the preceding steps for properly positioning the frame members and panels, delaminating stresses are offset.

As the flowable material 183 cures to form a core, shoulders or abutting portions 183B and 183C of the overlapping portion 183A bear against the peripheral edges 171C and 173C of the panels 171 and 173 to offset stresses caused by different thermal coefficients of expansion of the panels and the flowable material. Specifically, the cured flowable material 183 has a higher coefficient of expansion than the panels 171 and 173, and the edges 171C and 173C of the panels engage the shoulders 183B and 183C of the flowable material to resist shrinkage of the flowable material as it cools and to reduce the shear stress along the inner surfaces 171A and 173A of the panels which would tend to delaminate the laminated structure. This inhibits delamination caused by temperature changes experienced both during curing and in use, thus improving integrity of the lamination in a reproducible, less time consuming manner.

Although an exemplary embodiment of the invention has been shown and described, many changes, modifications, and substitutions may be made by one having ordinary skill in the art without necessarily departing from the spirit and scope of this invention.

What is claimed is:

1. A glass laminated structure, comprising:
   first and second glass panels in generally parallel, spaced-apart juxtaposition having inwardly facing inner surfaces and oppositely disposed outer surfaces, each of the first and second glass panels having a circumscribing peripheral edge extending between the inner and outer surfaces and each of the outer surfaces having a marginal portion extending to the peripheral edge;
   first and second frame members in generally parallel, spaced-apart juxtaposition circumscribing regions of the first and second glass panels, respectively, each of the first and second frame members overlapping a respective one of the marginal portions of the glass panels;
   frame sealing means for sealing each of the first and second frame members to the respective marginal portion;
   a core of cured material disposed between the glass panels and between the frame members and adhering the glass panels and frame members together, said core having a higher coefficient of expansion than the glass panels;
   the core having first and second shoulders disposed between the frame members in a position abutting the peripheral edges of the first and second glass panels, respectively; and
   a seal member circumscribing said core at least partially between the first and second frame members.

2. A glass laminated structure as recited in claim 1, further comprising:
   barrier means, including a photochromic substance disposed within the core, for inhibiting the passage of thermal radiation.

3. A glass laminated structure as recited in claim 1, wherein:
   the core is composed of an epoxy material.

4. A glass laminated structure as recited in claim 1, wherein:
   the frame sealing means includes a sealing material disposed between the frame members and the glass panels.

5. A glass laminated structure as recited in claim 4, wherein:
   the frame sealing means includes a sealing material that is cured by exposure to ultraviolet light.

6. A glass laminated structure as recited in claim 1, wherein:
   the seal member is composed of a material compatible with the curable flowable material at high temperatures.

7. A glass laminated structure as recited in claim 1, wherein:
   the seal member is composed of silicone.

8. A glass laminated structure as defined in claim 1 wherein the cured material is an epoxy and the frame sealing means includes an ultraviolet cured adhesive.

9. A glass laminated structure comprising:
   first and second glass panels in generally parallel, spaced apart relationship, each of said panels having a peripheral edge;
   first and second frame members in generally parallel, spaced apart relationship and circumscribing regions of the first and second glass panels, respectively;
   sealing means for sealing between the first panel and the first frame member and between the second panel and the second frame member;
   a core of cured material between the glass panels and frame members and adhering the glass panels and frame members together; and
   a seal circumscribing said core at least partially between the frame members.

10. A glass laminated structure as recited in claim 9 wherein the sealing means includes an ultraviolet cured sealant.

11. A glass laminated structure as defined in claim 9 wherein the seal is penetrable by a needle.

12. A glass laminated structure as defined in claim 9 wherein the seal is constructed of silicone.

* * * * *

UNITED STATES PATENT AND TRADEMARK OFFICE
CERTIFICATE OF CORRECTION

PATENT NO. : 4,999,246
DATED : March 12, 1991
INVENTOR(S) : Jechel et al

It is certified that error appears in the above-identified patent and that said Letters Patent is hereby corrected as shown below:

Column 7, line 21 after "platens" insert a period.

Column 9, line 11 change "claim 1," to -- claim 6, --

Signed and Sealed this

Tenth Day of November, 1992

Attest:

DOUGLAS B. COMER

*Attesting Officer*  *Acting Commissioner of Patents and Trademarks*